C. B. PARKS & B. E. STURDEVANT.
GRAIN SEPARATOR.
APPLICATION FILED NOV. 11, 1907.
984,487.
Patented Feb. 14, 1911.
5 SHEETS—SHEET 4.
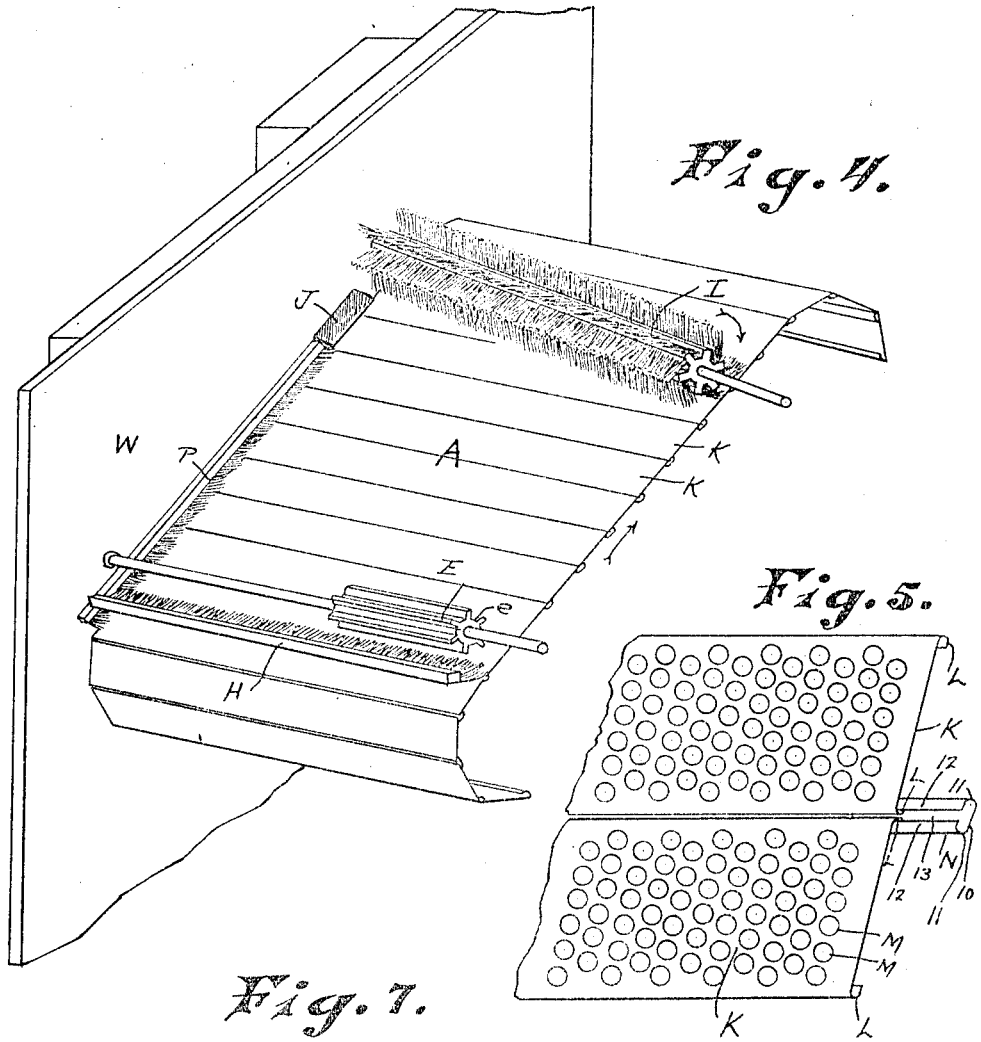
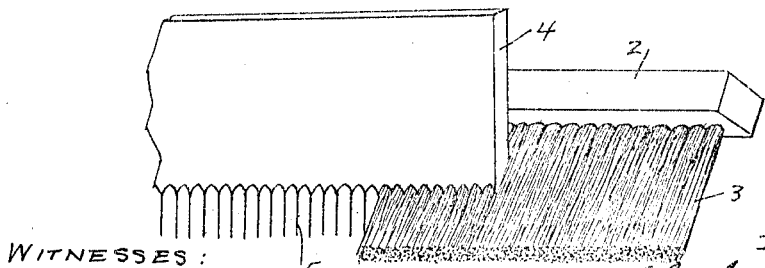
WITNESSES:
O. R. Erwin
M. M. Schulz
INVENTORS
Charles B. Parks
Berton E. Sturdevant
By Erwin & Wheeler
ATTORNEYS

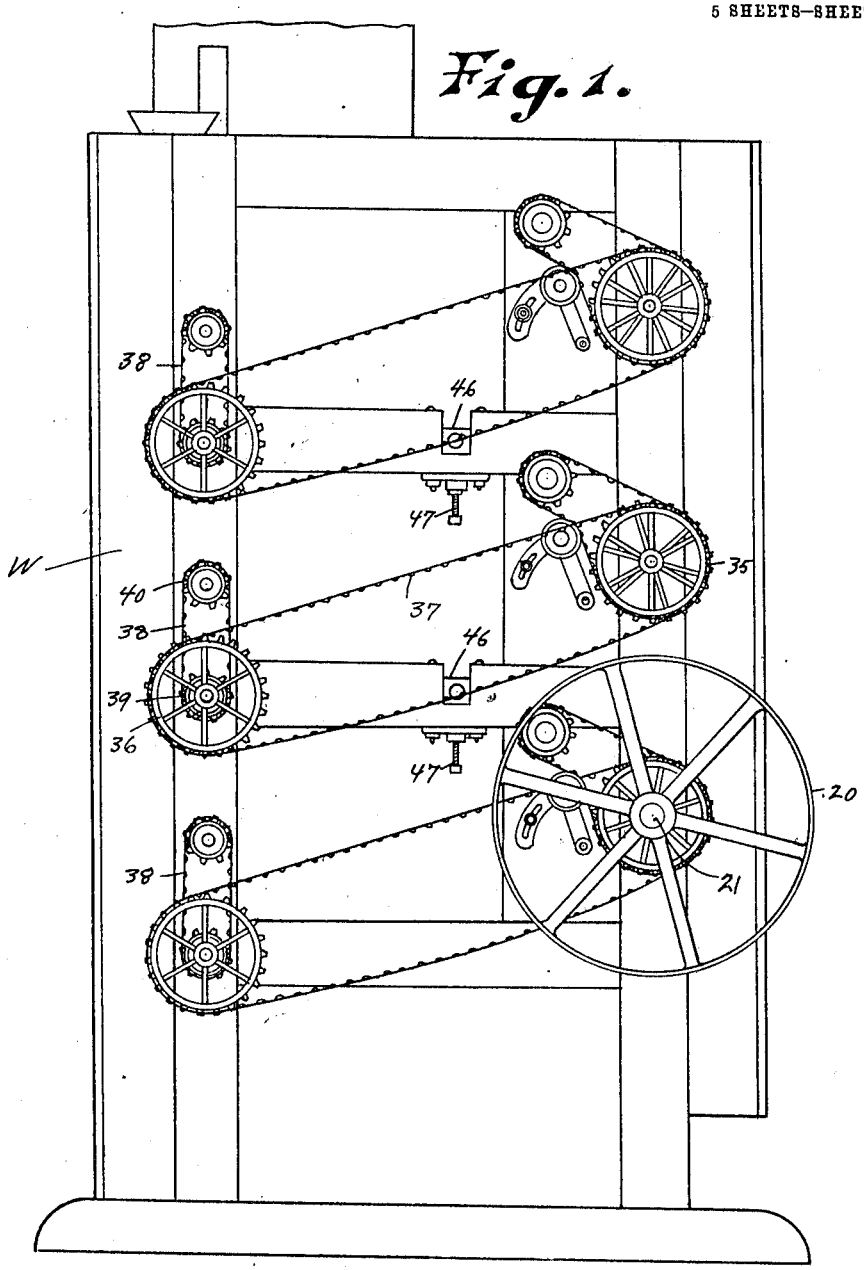

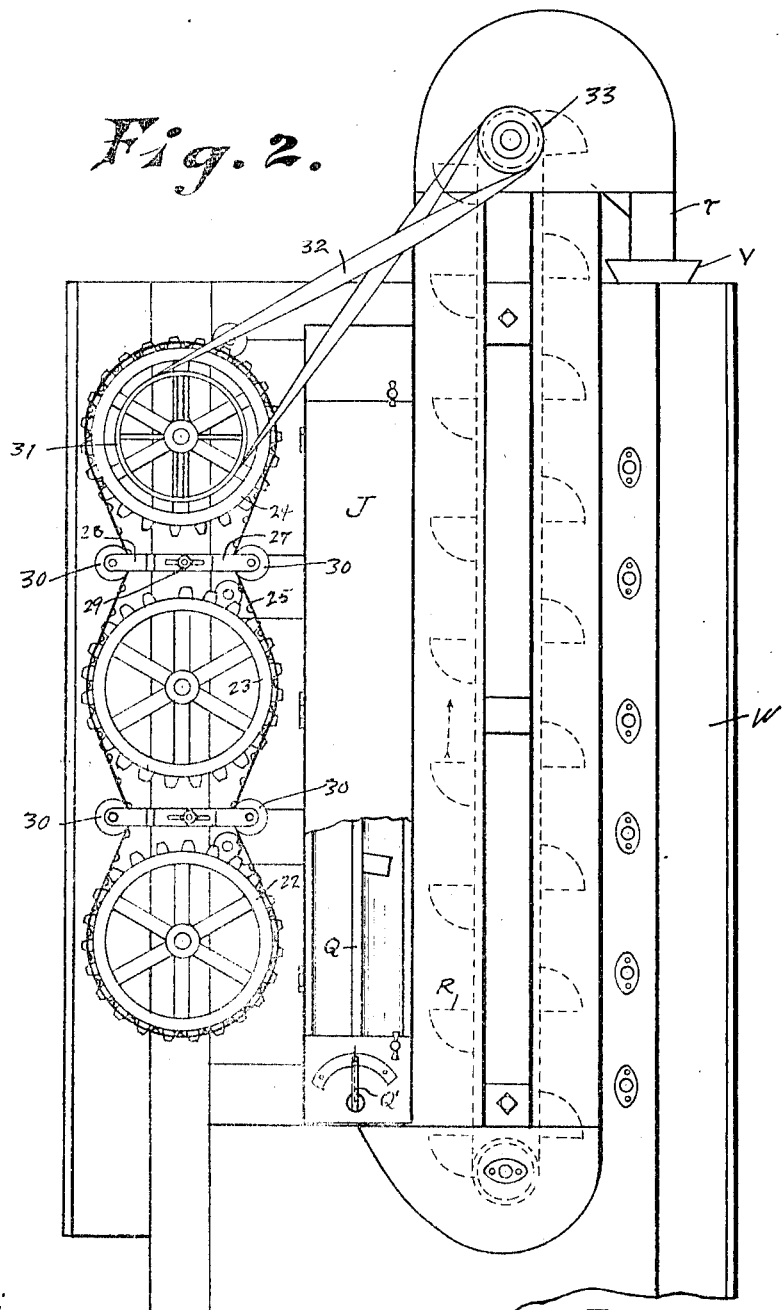

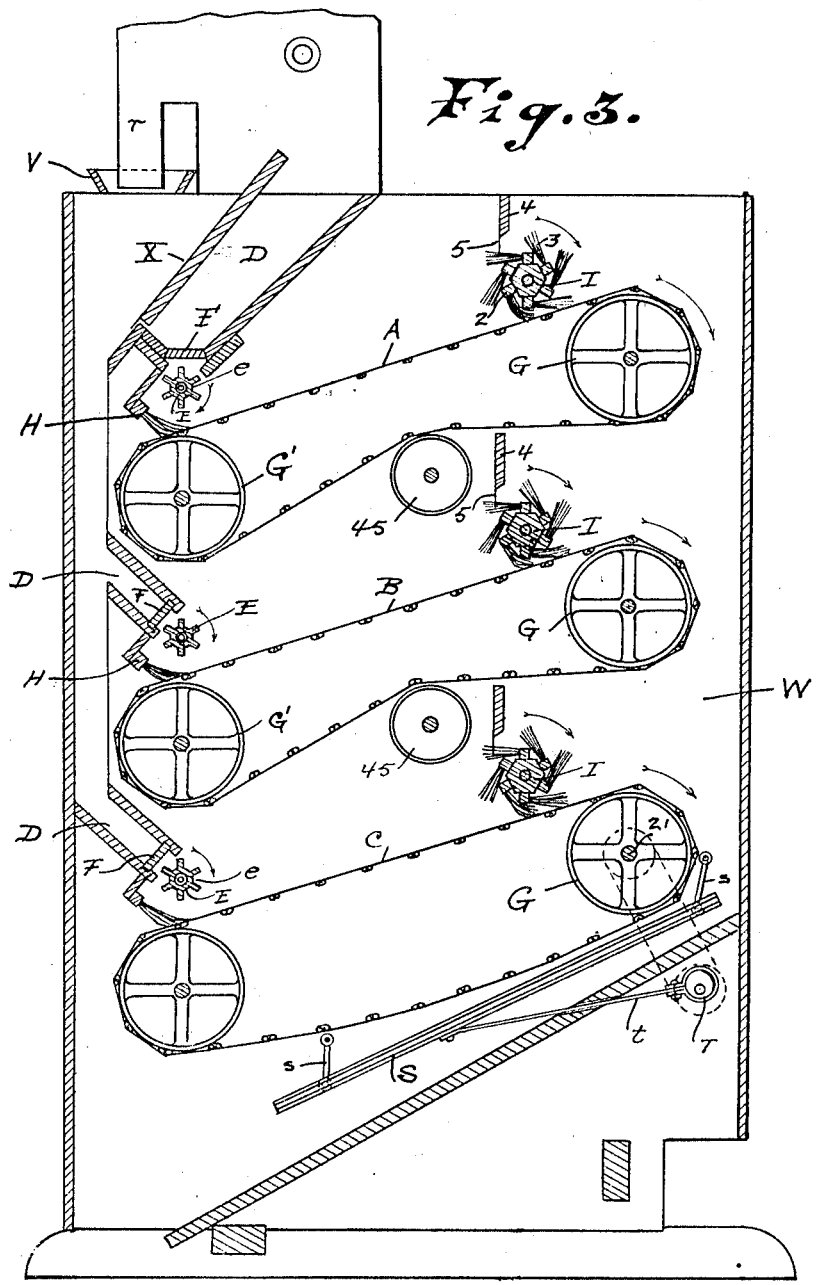

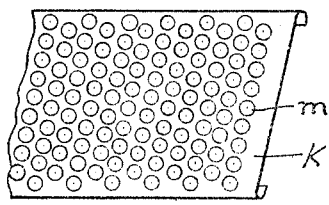
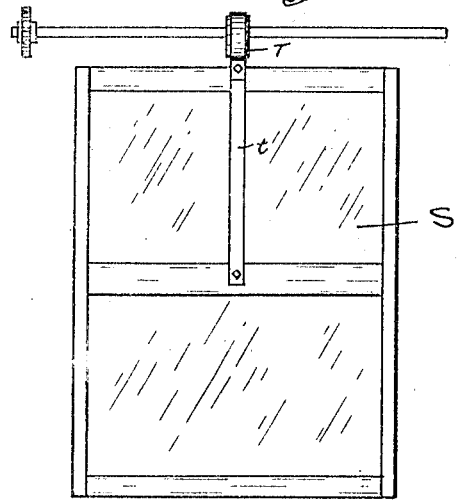
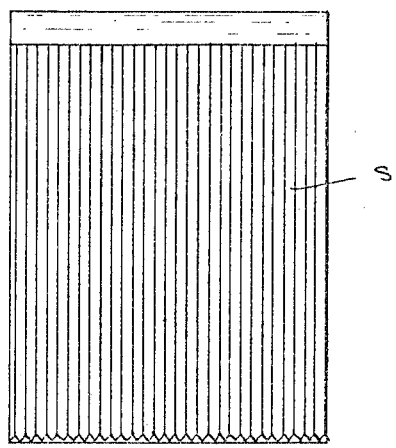
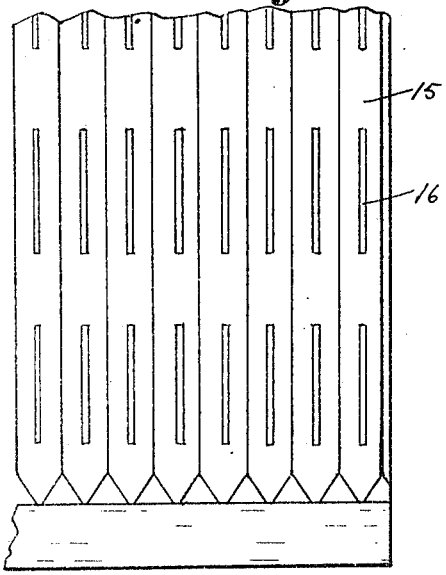
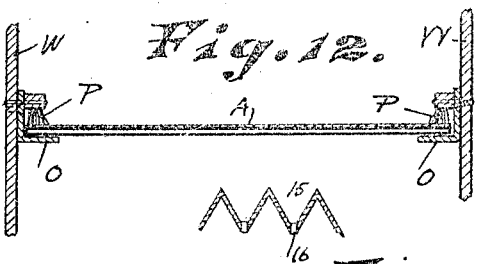

UNITED STATES PATENT OFFICE.

CHARLES B. PARKS AND BERTON E. STURDEVANT, OF SPARTA, WISCONSIN, ASSIGNORS, BY MESNE ASSIGNMENTS, TO C. T. THORBUS, OF SPARTA, WISCONSIN.

GRAIN-SEPARATOR.

984,487.   Specification of Letters Patent.   Patented Feb. 14, 1911.

Application filed November 11, 1907. Serial No. 401,769.

*To all whom it may concern:*

Be it known that we, CHARLES B. PARKS and BERTON E. STURDEVANT, citizens of the United States, residing at Sparta, county of Monroe, and State of Wisconsin, have invented new and useful Improvements in Grain-Separators, of which the following is a specification.

This invention relates to improvements in grain separators and pertains especially to improvements in that class of machines shown and described in the former patent to George W. Richardson, dated August 16, 1898, and numbered 609,212.

The object of the present invention is to provide an improved form of separating conveyer, to provide for a complete removal of the oats from the separating brush, on the side of approach, and to provide improved controlling and regulating mechanism hereinafter more specifically pointed out and claimed; also to provide improved means for separating seeds of different sizes and shapes either in separate operations or in the same operation at successive stages, it being possible for example to first separate oats from wheat and then separate flax seed from wheat at a subsequent stage of a continuous operation, and it being also possible to adapt the machine for the separation of seeds of weeds or smaller grains from the wheat, either after the separation of oats from the wheat or in an independent operation.

In the following description reference is had to the accompanying drawings in which, Figures 1 and 2 are side elevations. Fig. 3 is a vertical sectional view drawn to a plane cutting the conveyer aprons longitudinally. Fig. 4 is a detail perspective view showing one of the aprons. Fig. 5 is a detail view, enlarged, of two connected apron members. Fig. 6 is a similar view showing a member of a substitute apron, having smaller seed receiving pits. Fig. 7 is a detail view of a portion of the separating brush and comb. Fig. 8 is a plan view of a separating screen used for flax seed. Fig. 9 is a view of the screen supporting frame or shaker as seen from the underside. Fig. 10 is a detail view, enlarged, of a portion of the flax seed screen. Fig. 11 is a detail view, enlarged, of a portion of the flax seed screen in cross section. Fig. 12 is a detail cross section through one of the aprons.

Like parts are identified by the same reference characters throughout the several views.

In said former patent the grain is fed from a hopper to the upper surface of a single inclined conveyer apron at a point near the lower end of such apron and is carried by the apron upwardly to a diagonally disposed brush which sweeps the oats laterally into a side chute. In the improved machine, the inclined conveyer aprons A, B, and C are preferably arranged in series, one above another, and each is provided near its lower end with a feed hopper D and a feed regulator E, the latter comprising a cylindrical member provided with peripheral buckets $e$. A slide F controls the delivery of the material from the hopper to the buckets of the feed regulator. At its upper and lower ends, each conveyer apron extends over rollers G, G', respectively. Below the feed regulator E near the lower end, a transversely disposed brush H is arranged to prevent the grain from sliding from the lower end of the conveyer, this feature being also found in said former patent. The diagonally disposed brush I near the upper end of the apron is also arranged in substantially the same relation to the apron and to a side chute J (Fig. 4) as shown in said former patent, but the brush is somewhat differently constructed and comprises a central member 1 having radially projecting wings 2, each of which is provided with a row of bristles 3 arranged with the bristles extending tangentially to the circle of rotation, whereby the bristles are drawn trailingly along the surface of the conveyer and the ends of the bristles do not extend into the wheat receiving pockets of the conveyer to the same extent that they would do if disposed radially. A fixed member 4, arranged parallel to the brush, is provided with downwardly extending teeth 5 and is adapted to serve as a comb to remove the oats from the bristles on the upwardly moving side, thus preventing the oats from being carried over and deposited upon the conveyer beyond the brush.

Each of the conveyers is composed of a series of members K, and each of these members is stamped from sheet metal, with hook-shaped front and rear margins L. It will be observed, that the margins L are rounded downwardly in a generally cylindrical form and turned inwardly or underneath the body of the conveyer member. The outer surfaces of these hook shaped margins abut the surfaces of the adjacent members. This form of construction has been found peculiarly adapted to prevent the grain from catching and being crushed between the ends of the sections, since the grain will lift or move outwardly, whenever there is a relative movement of the sections, in a direction which would tend to crush the grain if it remained in position at the joint. The upper surface of the metal is also pressed downwardly to form a series of pits or pockets M adapted to receive the smaller grains. Where it is desired to separate oats from wheat, these pits or pockets M are so formed as to receive the grains of wheat, while the oats, being longer, are left on the surface or project outwardly from the pits so as to be caught by the brush and swept backwardly along the conveyer, with a lateral trend owing to the diagonal position of the brush. The members K are connected by a link member N which may also be formed of a sheet metal strip having its front and rear margins bent upwardly and inwardly, the strip thus forming a back 10, sides 11 and inwardly projecting flanges 12, with a slot 13 between the flanges adapted to receive the hook margins L of the members K as best shown in Fig. 5. This construction permits the separation of the members K by merely removing the link member L laterally, so that one style of apron may be readily and quickly substituted for another. This is of importance for the reason that it is sometimes desirable to separate the seeds of weeds from wheat or other of the smaller grains, and to accomplish this, it is necessary to remove the apron illustrated in Fig. 5 and substitute an apron composed of similar members and having smaller pits or pockets m, as shown in Fig. 6. These pits or pockets m are of less size than that of the smaller grains of wheat.

The margins of the aprons between the rollers G, G' are supported by an angle iron member O which is provided with an inwardly projecting flange upon which the apron margins rest. To prevent the grain from passing laterally from the apron and grinding between the apron margins of this supporting member O, we have provided the side margins (Fig. 4) with a longitudinally fixed brush P, the bristles of which project inwardly to the upper surface of the apron and brush back the grains which are moving toward the edge. The chute J which receives the oats or other grain not capable of entering the pockets on the aprons, is preferably divided vertically by a wall Q, thus separating the chute into two vertical passages, one which is preferably arranged to receive grain from the upper apron, while the other receives the grain from the two lower aprons. At the foot of the divided chute, a wing switch Q' is located by means of which the grain from both sections of the chute may be diverted to the elevator R or discharged to the floor at the side of the machine, or, if desired, the switch may be adjusted to the vertical position, in which case the grain from the upper apron will be delivered to the floor, and that from the lower aprons will be delivered to the elevator R and returned thereby through a spout r to the hopper D of the upper apron where it undergoes a recleaning process. When the return stream through the elevator is not sufficient to furnish full capacity, then a slide X forming one wall of the upper hopper D is raised sufficiently to let in a portion of the grain from the main supply hopper V. Where wheat and oats are in about equal proportions, the separating process is practically complete in one operation, making the recleaning process unnecessary. In such cases the slide X may be pulled out entirely and the grain fed originally from the main supply hopper to all of the aprons. In such cases the wing switch Q' is adjusted to deliver the grain from both passages in the chute J to the floor and the elevator is not used. Where there is but a small percentage of oats in the wheat, the brushes will remove some of the wheat from the apron pockets and in such cases the two lower aprons are employed to effect the initial separating process and the elevator is used to return the grains from the right hand side of the chute J (i. e., the tailings from the lower aprons) to the upper apron for a recleaning or re-separating operation. The elevator R comprises an ordinary bucket conveyer such as is commonly used in connection with threshing machines, etc. It is therefore not necessary to describe the same with particularity.

The grains carried by the pockets of the conveyers under the brushes I are permitted to fall to the shaking sieve S which is supported by links s and actuated from an eccentric T by a connecting rod t. This sieve is divided longitudinally into a series of channels 15, preferably V-shaped in cross section, and each channel is provided with narrow slots 16 along its base, whereby flax seed will be turned on edge in the channels and permitted to pass through the slots. The slots, however, are of less diameter than the wheat so that the latter passes downwardly to the end of this sieve. It is obvious that this sieve will also separate small wheat seeds from the wheat since they will also be permitted to pass through the slots 16.

Motion is communicated from the source of power to the several aprons by means of a pulley 20 which drives a shaft 21 upon which the lower roller G is mounted. From this shaft 21 motion is communicated to the other sharts G by means of the sprocket wheels 22, 23 and 24, over which sprocket chain 25 extends. Chain tighteners are employed between the several sprocket wheels comprising bars 27 and 28 adjustably connected by a clamping bolt or set screw 29, each of the bars 27, 28 being provided with pulleys or rollers 30 adapted to bear on the outer surface of the belt or chain and push the same inwardly in the spaces between the sprocket wheels. Motion is communicated from the shaft of the upper sprocket wheel 24 to the elevator through pulley 31, belt 32, and pulley 33.

In order to avoid strain upon the conveyer aprons, the shaft of each roller G is provided with a sprocket wheel 35 from which motion is communicated to sprocket wheels 36 mounted upon the shafts of the rollers G' by means of sprocket chains 37. The feed regulators are driven from the shafts of the rollers G' by means of sprocket chains 38 extending over the pinions 39 and 40. These driving connections are all located exterior to the casing W which incloses the conveyer aprons, so that the grain will be kept from the driving connections and the oil applied to the latter will be kept from the grain.

To regulate the tension of the conveyer aprons, A, B, and C, they are preferably passed over the rollers 45 on the underside. These rollers are mounted in movable journal boxes 46 which are adjusted vertically by means of set screws 47.

Having thus described this invention what is claimed as new and desired to be secured by Letters Patent is,

1. In a machine of the described class, a conveyer comprising the combination with supporting rollers, of a series of members, each formed of sheet metal having its surface indented and its front and rear margins rounded downwardly and inwardly turned to form connecting hooks, and connecting members adapted to embrace the marginal hooks of adjacent members.

2. In a machine of the described class, a conveyer comprising the combination with supporting rollers, of a series of members, each formed of sheet metal having its surface indented and its front and rear margins provided with downwardly and inwardly turned hooks, and removable connecting members having upwardly extending inturned flanges adapted to embrace the marginal hooks of adjacent members, together with driving connections arranged to apply the power to each of the supporting rollers, and a housing interposed between the driving connections and the adjacent side margin of the conveyer.

3. In a machine of the described class, a conveyer comprising the combination with supporting rollers, of a series of members, each formed of sheet metal having its surface indented and its front and rear margins provided with downwardly and inwardly turned hooks, and connecting members having upwardly extending inturned flanges adapted to embrace the marginal hooks of adjacent members, together with driving connections arranged to apply the power to each of the supporting rollers, a housing having one wall interposed between the driving connections and the adjacent side margin of the conveyer, and fixed supporting members connected with the housing at each side of the conveyer and forming bearings for the conveyer on its upwardly moving side and between the supporting rollers.

4. In a machine of the described class, a conveyer apron comprising a series of members, each formed of a sheet of suitable material, depressed at intervals to form pockets in its upper surface and having downwardly and inwardly turned rounded front and rear margins arranged with their outer surfaces abutting those of adjacent members and means for connecting said margins together in a flexible joint.

5. In a machine of the described class, the combination of a series of conveyer aprons one above another, each provided with pockets in its upper surface, a hopper for each apron arranged to supply grain thereto, a common supply hopper arranged to supply grain to each of the apron hoppers, slides controlling the flow of grain from the side hopper of each of the apron hoppers, a chute provided with a passage adapted to receive grain from the upper apron and having a separate passage adapted to receive grain from the other aprons, an elevator arranged to return grain from the chute to the upper apron, a wing switch controlling the delivery of grain from one or both of the chute passages to the elevator, together with rotary brushes arranged to sweep grain laterally from the upper surfaces of the respective aprons into the chute passages.

6. In a machine of the described class, the combination of a series of conveyer aprons, each provided with pockets in its upper surface, a hopper for each apron arranged to supply grain thereto, and a common supply hopper arranged to supply grain to each of the apron hoppers, and provided with slides controlling the grain delivery to any given hopper, together with a diagonally disposed rotary brush for each apron arranged to operate upon the upper surface thereof, a chute at the side of the aprons adapted to receive grain from the rearward ends of the brushes, said chute being provided with a vertical partition, an elevator arranged to receive grain from said chute and convey it to the upper apron hopper, and a wing switch controlling the delivery of grain from one or both sides of the chute to the elevator.

7. In a machine of the described class, the combination of a series of longitudinally inclined, conveyer aprons, one above another, each provided with pockets in its upper surface, a hopper for each apron arranged to supply grain thereto, and a common supply hopper arranged to supply grain to each of the apron hoppers, together with a diagonally disposed rotary brush for each apron arranged to operate upon the upper surface thereof, a chute at the side of the aprons adapted to receive grain from the rearward end of the brush, an elevator adapted to return the grain from the chute to the hopper of the upper apron, and a switch adapted to deflect the grain from the chute, either into or away from the elevator.

8. In a machine of the described class the combination of a series of conveyers provided with pockets in their upper surfaces, supporting rollers for the conveyers, a housing inclosing the same, and driving connections for each of the supporting rollers, exterior to the walls of said housing, together with fixed bristle brushes supported from the housing and arranged to sweep the grain inwardly from the margins of the conveyers.

9. In a machine of the described class, the combination of a series of conveyer aprons each provided with pockets in its upper surface, a hopper for each apron arranged to supply grain thereto, a diagonally disposed rotary brush for each apron arranged to operate on the upper surface thereof, a chute at the side of the aprons adapted to receive grain from the rearward end of said brushes, an elevator arranged to deliver grain from said chute to one of the apron hoppers, and means for delivering grain from an original source of supply to the other apron hoppers.

10. In a machine of the described class, the combination of a series of conveyer aprons, each provided with pockets in its upper surface, a hopper for each apron arranged to supply grain thereto, a diagonally disposed rotary brush for each apron arranged to operate on the upper surface thereof, a chute at the side of the aprons adapted to receive grain from the rearward end of said brushes, an elevator arranged to deliver grain from said chute to one of the apron hoppers, and means for delivering grain from an original source of supply to the other apron hoppers, together with the switch controlling the delivery of grain from the chute to the elevator and a slide controlling the delivery of grain to the original source of supply to the apron which is arranged to receive grain from the elevator.

In testimony whereof we affix our signatures in the presence of two witnesses.

CHARLES B. PARKS.
BERTON E. STURDEVANT.

Witnesses:
HOWARD TEASDALE,
R. A. RICHARDS.